United States Patent

Spiegler et al.

[11] Patent Number: 5,613,988
[45] Date of Patent: Mar. 25, 1997

[54] USE OF ORGANOFUNCTIONALLY MODIFIED POLYSILOXANES FOR DEFOAMING DIESEL

[75] Inventors: Roland Spiegler; Michael Keup, both of Essen; Kerstin Kugel, Ratingen; Peter Lersch, Oberhausen; Stefan Silber, Krefeld, all of Germany

[73] Assignee: Th. Goldschmidt AG., Essen, Germany

[21] Appl. No.: 359,091

[22] Filed: Dec. 19, 1994

[30] Foreign Application Priority Data

Dec. 17, 1993 [DE] Germany .......................... 43 43 235.2

[51] Int. Cl.$^6$ .................................................. C10L 1/28
[52] U.S. Cl. ............................. 44/320; 252/321; 252/358; 528/29
[58] Field of Search ................................ 252/321, 358; 44/320, 600; 528/29

[56] References Cited

U.S. PATENT DOCUMENTS

| | | | |
|---|---|---|---|
| 3,233,986 | 2/1966 | Morehouse | 252/321 |
| 4,082,690 | 4/1978 | Farminer | 252/321 |
| 4,690,688 | 9/1987 | Adams et al. | 44/320 |
| 5,271,868 | 12/1993 | Azechi et al. | 252/321 X |
| 5,435,811 | 7/1995 | Fey et al. | 252/321 X |
| 5,446,119 | 8/1995 | Herzig et al. | 252/321 X |
| 5,474,709 | 12/1995 | Herzig et al. | 252/321 |
| 5,542,960 | 8/1996 | Grabowski | 44/320 |

FOREIGN PATENT DOCUMENTS

| | | |
|---|---|---|
| 255737 | 4/1988 | Germany . |
| 3906702 | 9/1990 | Germany . |
| 4032006 | 4/1992 | Germany . |
| 2173510 | 10/1986 | United Kingdom . |
| 2248068 | 9/1990 | United Kingdom . |

OTHER PUBLICATIONS

Multifunktionelle Dieseladditive . . . , Gerhard Brandt, et al, Apr. 1992, 11 pages.

*Primary Examiner*—Richard D. Lovering
*Assistant Examiner*—Daniel S. Metzmaier
*Attorney, Agent, or Firm*—Anderson Kill & Olick P.C.

[57] ABSTRACT

A method of defoaming diesel fuel by adding an organofunctionally modified polysiloxane of the general Formula I

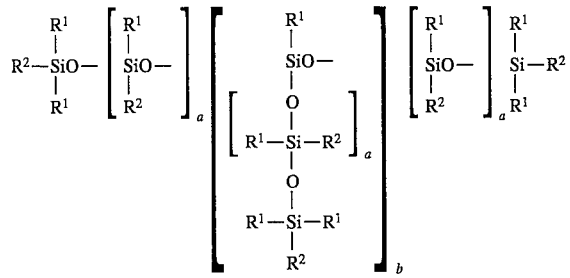

wherein
 $R^1$ are alkyl groups with 1 to 4 carbon atoms or aryl groups with the proviso that at least 80% of the $R^1$ groups are methyl groups,
 $R^2$ are the same or different in the molecule
 30 to 90% of $R^2$ having the same meaning as $R^1$, and
 70 to 10% of $R^2$ consisting of a mixture of $R^{2A}$ and $R^{2B}$ groups which differ in polarity,
is described. The inventive polysiloxane is added in an amount of 0.5 to 50 ppm, based on the diesel fuel.

2 Claims, No Drawings

USE OF ORGANOFUNCTIONALLY MODIFIED POLYSILOXANES FOR DEFOAMING DIESEL

FIELD OF INVENTION

The present invention relates to a method of defoaming diesel fuel by adding inventive antifoaming agents which allow the formulation of low foaming diesel fuel having a lower silicon content. Such agents also have improved compatibility with the additive packages conventionally used with the fuel.

BACKGROUND INFORMATION AND PRIOR ART

The hydrocarbon mixtures, used as diesel fuel, have the undesired property of interacting with air and developing foam when filled into tanks such as storage tanks and fuel tanks of motor vehicles. This leads to a delay in the filling process as well as inadequate filling of the tanks. It is therefore customary to add defoamers to the diesel fuel. These defoamers should be effective at low concentrations and must not form any harmful residues when the diesel fuel undergoes combustion in the engine, nor should they affect the combustion of the fuel negatively. Correspondingly effective defoamers are described in numerous patent literature.

For example, the British patent 2,173,510 relates to a method for defoaming diesel fuel or jet fuel. For this method, an anti-foaming agent is added to the fuel. This anti-foaming agent consists essentially of an organopolysiloxane of the following formula

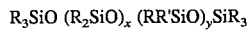

$$R_3SiO\,(R_2SiO)_x\,(RR'SiO)_y\,SiR_3$$

wherein the ratio of x:y lies in the range of 1:1 to 9:1, each R group is a univalent hydrocarbon group and at least 80% of the R groups are methyl groups, each R' group is a substituted group of the general formula $Q(OA)_nOZ$, in which Q is a divalent group linked to a silicon atom, A is an alkylene group and at least 80% of these groups are ethylene groups, Z is a hydrogen group or an OCR" group, in which R" is a univalent group, n has a value of 5 to 25, and the copolymer has an average molecular weight so that the OA groups constitute 25 to 65% by weight of the calculated molecular weight of the copolymer, the copolymer being soluble in an organic solvent. The antifoaming agent is used at concentration of 1 to 100 and preferably 5 to 50 ppm, based on the diesel fuel.

The *German Offenlegungsschrift* 40 32 006 discloses a method for defoaming and/or degassing organic systems by adding an antifoaming agent containing an organopolysiloxane to these organic systems containing diesel oil and/or crude oil or cracking products thereof. As organopolysiloxane, a polymer is used, which consists of siloxane units of the general formula

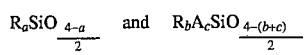

$$R_aSiO_{\frac{4-a}{2}} \quad \text{and} \quad R_bA_cSiO_{\frac{4-(b+c)}{2}}$$

wherein

R is a univalent hydrocarbon group with 1 to 18 carbon atom(s) per group,

A is a group of the general formula

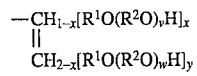

$$\begin{array}{c}-CH_{1-x}[R^1O(R^2O)_vH]_x\\ \|\\ CH_{2-x}[R^1O(R^2O)_wH]_y\end{array}$$

wherein $R^1$ represents a group of the formula $-CR^3H-$, in which $R^3$ is a hydrogen or a univalent organic group, $R^2$ is a group having the formula $-CR^4H-CH_3$ or $-(CH_2)_3-$, in which $R^4$ is a hydrogen or univalent organic group, v, w in each case are 0 or a whole number, the average value of v+w being 0 to 16, x, y are 0 or 1, x+y being 1 or 2, a=1, 2 or 3, b=0, 1 or 2, and c=1 or 2, the sum of b+c not exceeding 3.

The siloxanyl-alkenediyl-bis-ω-hydroxy-polyoxyalkylenes and their synthesis are described in the DD patent 255 737.

The antifoaming agents for diesel fuels described above and others known from the state of the art have various disadvantages. For example, the silicon content of typical polysiloxane polyoxyalkylene copolymers is 10 to 15% by weight. For organopoly-siloxanes with alkenediyl-bis-ω-hydroxypolyoxyalkylenes, the silicon content is even 20 to 25% by weight. Since compounds with such a high silicon content can lead to undesirable silica depositions when combusted in the engine, there is a need for defoamers for diesel fuels with a lower silicon content or, at least, improved foam prevention and foam elimination, in order to be able to reduce the concentration at which these additives are used.

A further disadvantage of the known antifoaming agents consists in their frequent inadequate compatibility (miscibility) with the additive packages, which are added to the crude diesel oil for improving its properties. Additive packages are defined as mixtures of different additives, such as materials for improving the combustion behavior, materials for decreasing the formation of smoke, materials for decreasing the formation of harmful exhaust gases, inhibitors for decreasing corrosion in the engine and its parts, surface active substances, lubricants and the like. Such additive packages are described, for example, in the Japanese publication 05 132 682, the British patent 2,248,068 and in the journal Mineralöltechnik, 37(4), 20 pp. The additives of the additive package are dissolved in an organic solvent and form a stock concentrate, which is added to the crude diesel fuel. Anti-foaming agents with polar groups frequently cannot be incorporated uniformly into these additive packages or separate upon storage.

OBJECT OF THE INVENTION

An object of the present invention is a method of defoaming diesel fuel by adding antifoaming agents with a lower silicon content and/or improved action and improved compatibility with the additive packages conventionally used with the fuel.

Pursuant to the invention, this combination of properties is to be found in a selected, organofunctionally modified polysiloxane.

SUMMARY OF THE INVENTION

Pursuant to the present invention, this objective can be accomplished by the use of organofunctionally modified polysiloxane of the general Formula I $$R^2-\underset{\underset{R^1}{|}}{\overset{\overset{R^1}{|}}{Si}}O-\left[\underset{\underset{R^2}{|}}{\overset{\overset{R^1}{|}}{Si}}O-\right]_a\left[\underset{\underset{R^1-\overset{|}{\underset{|}{Si}}-R^1}{|}}{\overset{\overset{R^1}{|}}{Si}}O-\right]_b\left[\underset{\underset{R^2}{|}}{\overset{\overset{R^1}{|}}{Si}}O-\right]_a\underset{\underset{R^1}{|}}{\overset{\overset{R^1}{|}}{Si}}-R^2$$

wherein
$R^1$ are alkyl groups with 1 to 4 carbon atoms or aryl groups, with the proviso that at least 80% of the $R^1$ groups are methyl groups,
$R^2$ are the same or different in the molecule,
30 to 90% of $R^2$ having the same meaning as $R^1$, and 70 to 10% of $R^2$ consisting of a mixture of $R^{2A}$ and $R^{2B}$ groups, wherein the $R^{2A}$ groups are more polar than the $R^{2B}$ groups and the $R^{2A}$ groups are selected from the following groups:

(a) the $-\underset{\underset{H}{|}}{\overset{\overset{O}{||}}{C}}-(CHR^3-)_c(OC_2H_4-)_d(OC_3H_6-)_eOH$
$\phantom{(a) the }C-(CHR^3-)_c(OC_2H_4-)_d(OC_3H_6-)_eOH$ group, wherein
$R^3$ is a hydrogen or alkyl group,
c is a number from 1 to 20,
d is a number from 0 to 50,
e is a number from 0 to 50, or (b) the $-(CH_2-)_fOR^4$ group, wherein.
$R^4$ is a hydrogen or a univalent organic group,
f is a number from 3 to 20, or (c) the $-(CH_2-)_g(OC_2H_4-)_h(OC_3H_6-)_iOR^5$ group, wherein
$R^5$ is a hydrogen or a univalent organic group,
g is a number from 3 to 6,
h is a number from 1 to 50,
i is a number from 0 to 20 and the ratio of h:i >5:2, and
the $R^{2B}$ group is selected from the following groups:

(d) the $-\underset{\underset{H}{|}}{\overset{\overset{O}{||}}{C}}-(CHR^6-)_k(OC_2H_4-)_m(OC_3H_6-)_nOR^7$
$\phantom{(d) the }C-(CHR^6-)_k(OC_2H_4-)_m(OC_3H_6-)_nOR^7$ group, wherein
$R^6$ is a hydrogen or alkyl group,
$R^7$ is an alkyl, acyl or trialkylsilyl group
k is a number from 1 to 20,
m is a number from 0 to 50,
n is a number from 0 to 50, or (e) the $-(CH_2-)_oCH_3$ group, wherein
o is a number from 5 to 30, or (f) the $-(CH_2-)_g(OC_2H_4-)_h(OC_3H_6-)_iOR^5$ group wherein
$R^5$ is hydrogen or a univalent organic group,
g is a number from 3 to 6,
h is a number from 0 to 35,
i is a number from 1 to 50 and the ratio of h:i <5:2,
a is a number from 1 to 400,
b is a number from 0 to 10,
for defoaming diesel fuel in amounts of 0.5 to 50 ppm based on the diesel fuel.

The siloxane backbone can be linear (b=0) or branched (b>0 to 10). The value of b, as well as the value of a are to be understood as average values in a polymer molecule, since the polysiloxanes, which are to be used pursuant to the invention, are usually present as equilibrated mixtures.

The $R^1$ groups are alkyl groups with 1 to 4 carbon atoms, such as methyl, ethyl, propyl, butyl groups or aryl groups, the phenyl groups being preferred. On the basis of price and ease of synthesis, the methyl groups are preferred, so that at least 80% of the $R^1$ groups must be methyl groups. Especially preferred are those polysiloxanes, in which all the $R^1$ groups are methyl groups.

The essence of the present invention lies particularly in that organofunctionally modified polysiloxanes are used, which have organofunctional $R^2$ groups. These $R^2$ groups are selected from two main groups, namely the $R^{2A}$ groups and the $R^{2B}$ groups. The two groups, $R^{2A}$ and $R^{2B}$, differ in their polar character. The $R^{2A}$ groups are more polar than the $R^{2B}$ groups, which are present at the same time. By means of this selection of the $R^{2A}$ and $R^{2B}$ groups, it is possible to optimize the compatibility of the polysiloxanes of Formula I, which are to be used pursuant to the invention, with diesel fuel and, simultaneously with the optimum compatibility, achieve optimum defoaming action.

The ratio of the polar $R^{2A}$ groups to the less polar $R^{2B}$ groups can be varied within wide limits. It has proven to be advantageous to adjust the ratio of the two groups to a value of 10:1 to 1:3 and particularly to a value of 6:1 to 2:1. However, not all the $R^2$ groups need be chosen from the $R^{2A}$ groups and the $R^{2B}$ groups. A portion of these groups can also have the same meaning as the $R^1$ groups, that is, a portion of the $R^2$ groups can also be alkyl groups with 1 to 4 carbon atoms or aryl groups. In this case also, the groups preferably should be methyl groups.

Accordingly, $R^2$ can be the same or different in a molecule and is defined as follows:

30 to 90% of all $R^2$ groups can have the same meaning as the $R^1$ groups, with the proviso that 70 to 10% of the $R^2$ groups consist of a mixture of $R^{2A}$ and $R^{2B}$ groups.

In the following, the possible polar $R^{2A}$ groups are described in greater detail. The following groups are available for selection:
The (a) Group $-\underset{\underset{H}{|}}{\overset{\overset{O}{||}}{C}}-(CHR^3-)_c(OC_2H_4-)_d(OC_3H_6-)_eOH$
$\phantom{xx}C-(CHR^3-)_c(OC_2H_4-)_d(OC_3H_6-)_eOH$ In the (a) group, $R^3$ is a hydrogen or an alkyl group and, in particular, a lower alkyl group with 1 to 4 carbon atoms. Preferably, it is the hydrogen group. The subscript c is a number from 1 to 20 and preferably is 1. The subscripts d and e, independently of one another, are numbers from 0 to 50. An (a) group is preferred, in which $R^3$ is a hydrogen group, subscript c is 1 and subscripts d and e, independently of one another, are in each case 0 to 10.

These subscripts are average numbers, since it is well known that a mixture of compounds of different chain length is obtained from the addition reaction between alkylene oxides, such as ethylene oxide and propylene oxide, and alcohols.

The (a) groups can be introduced into the molecule of the polysiloxane by the addition reaction of alkenediyl-bis-ω-hydroxy-polyoxyalkylenes with the SiH groups of the polysiloxane in the presence of a hydrosilylation catalyst corresponding to the method of the DD patent 255 737.

The (b) Group $$-(CH_2-)_f OR^4$$

In the (b) group, $R^4$ is a hydrogen or a univalent organic group. As univalent organic groups, the usual end-blocking groups, particularly the lower alkyl groups with 1 to 4 carbon atoms, come into consideration. Subscript f is a number from 3 to 20, the numerical value of 6 being preferred.

The (b) groups can be introduced, as already described above, by means of a hydrosilylation reaction by the addition reaction between alkenols or their derivatives and the SiH groups of organopolysiloxanes. Examples of such an alkenol and its end-blocked derivative are hexenol or the alkylether of hexenol.

The (c) Group $$-(CH_2-)_g(OC_2H_4-)_h(OC_3H_6-)_i OR^5$$

In the (c) group, $R^5$ is a hydrogen or a univalent organic group. Preferably, $R^5$ is a hydrogen group or a methyl group. Subscript g is a number from 3 to 6, subscript h is a number from 1 to 50 and subscript i is a number from 0 to 20, the numerical ratio being h:i >5:2. Preferably, subscript g has a value of 3, subscript h a value of 8 to 30 and subscript i a value of 0 to 12.

The (c) groups can also be introduced by means of the above-described hydrosilylation reaction by the addition reaction between alkenol polyethers or their derivatives and the SiH groups of organopolysiloxanes.

The description of the $R^{2B}$ groups, the polarity of which is less than that of the $R^{2A}$ groups, now follows. The $R^{2B}$ groups may be selected from the following:

The (d) Group $$\begin{array}{c} -C-(CHR^6-)_k(OC_2H_4-)_m(OC_3H_6-)_n OR^7 \\ \parallel \\ C-(CHR^6-)_k(OC_2H_4-)_m(OC_3H_6-)_n OR^7 \\ | \\ H \end{array}$$

The (d) group can be compared with the (a) group (within the possibilities of the $R^{2A}$ group) and differs from this by the blocking of the terminal hydroxyl groups. The end-blocking $R^7$ group is an alkyl, acyl or trialkylsilyl group. The methyl, acetyl or trimethylsilyl group is preferred. By this modification, the compatibility of the anti-foaming agent in the additive package is improved significantly. With respect to their definition, the $R^3$ group corresponds to the $R^6$ group and the subscripts c, d and e correspond to the subscript k, m and n. The same is true for the preferred meanings.

The (e) Group $$-(CH_2-)_o CH_3$$

In the (e) group, the subscript o has a numerical value of 5 to 30 and preferably of 11 to 17. It is a long-chain alkyl group. These groups considerably improve the compatibility of the siloxane, which is to be used pursuant to the invention, with the additive package.

These groups can be obtained by the hydrosilylation addition reaction between α-olefins and SiH groups of the organopolysiloxane.

The (f) Group $$-(CH_2-)_g(OC_2H_4-)_h(OC_3H_6-)_i OR^5$$

The (f) group can be compared with the (c) group (within the possibilities for the $R^{2A}$ group) and differs from this in the number of different oxyalkylene units, namely subscript h is a number from 0 to 35 and the subscript i is a number from 1 to 50, the ratio of subscripts h:i being less than 5:2. Preferably, h has a numerical value of 0 to 17 and i has a numerical value of 6 to 26, while g is a number from 3 to 6 and preferably is 3.

The (f) groups can also be introduced by means of a hydrosilylation reaction, as described above, by the addition reaction between alkenol polyethers or their derivatives and SiH groups of the organopolysiloxane.

The organofunctionally modified polysiloxanes, which are to be used pursuant to the invention, can be added directly to the diesel fuel, an addition of 0.5 to 50 ppm, based on the diesel fuel, being sufficient for effective defoaming. Preferably, the addition is 2 to 20 ppm. This low amount added results in a low absolute silicon content in the diesel fuel.

It is, however, also possible and is preferred to add the polysiloxane, which is to be used pursuant to the invention, to the additive package, which was described above.

In order to improve the compatibility of the organofunctionally modified polysiloxane, which is to be used pursuant to the invention, particularly with the additive package, it may be advantageous to employ the organopolysiloxane, of Formula I, which is to be used pursuant to the invention, in a mixture with a polyether.

The mixture may contain up to 90% by weight of a polyether of the general Formula II $$R^8-(C_2H_4O-)_p(C_3H_6O-)_q(C_4H_8O-)_r R^9$$

wherein $R^8$ is a hydroxyl or alkoxy group, $R^9$ is a hydrogen, alkyl or alkenyl group, p, q and r each is a number from 0 to 100, the sum of which is 1 to 200.

The polyether of Formula II should be compatible with the polysiloxane and the additive package. It should be readily dispersible in the diesel fuel that is to be defoamed. The optimum composition of the polyether within the given range and the optimum mixing ratio can be determined by preliminary experiments. A mixing ratio of polysiloxane: polyether of 1:9 to 2:3 is preferred.

The $R^8$ of the polyether is a hydroxy or alkyloxy group, preferably a hydroxy group. The $R^9$ group of the polyether is a hydrogen, alkyl or alkenyl group and preferably an alkyl group. The subscripts p, q and r have average values each of 0 to 100, the sum of p+q+r being 1 to 200.

In addition, the dispersing of the mixture of polysiloxane of Formula I, which is to be used pursuant to the invention, with the polyether of Formula II can be favored by the addition of an emulsifier, which should have an HLB value of >5. Up to 30% of the polyether of the general Formula II can be replaced by this emulsifier, so that a typical example of a defoamer, which contains polyether as well as alcohol, can have the following composition:

10% by weight of the organofunctionally modified siloxane of Formula I,

63% by weight of the polyether of Formula II, and

27% by weight of emulsifier.

A preferred mixture of organofunctionally modified polysiloxane of Formula I with the polyether of Formula II and an emulsifier consists of 10 to 40% by weight of the organofunctionally modified polysiloxane of Formula I, 50 to 89% by weight of the polyether of Formula II, and 1 to 10% by weight of emulsifier.

Examples of suitable emulsifiers are polyoxyalkylene ethers of fatty alcohols or ethoxylated nonylphenols. Further suitable emulsifiers are transesterification products of polyacrylates with a mixture of polyether monools and alkanols or alkenols. Such transesterification products of polyacrylates with alcohols are disclosed, for example, in the German patent 39 06 702.

In the following examples, the synthesis of the organofunctionally modified organopolysiloxanes of Formula I, which are to be used pursuant to the invention, is shown first, it being understood that these Examples are provided by way of illustration and not by way of limitation. The products, prepared in these examples, are labeled T1 to T9.

EXAMPLE 1

Preparation of Defoamer T1

Ethoxylated 2-butyne-1,4-diol (150.1 g, 0.82 moles), 4 mg (=20 ppm of Pt) of hexachloroplatinic acid $H_2PtCl_6$ and 100 mL of toluene are added to a 500 mL 4-neck flask, equipped with stirrer, dropping funnel, thermometer and reflux condenser and heated to 110° C. At this temperature, 212.7 gram (0.1 moles) of a polydimethylsiloxane, functionalized laterally with SiH groups and having the general formula

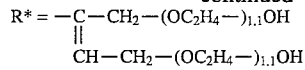

are added dropwise in such a manner that, despite the exothermic reaction setting in, a temperature of 130° C. is not exceeded. At the end of the addition, the reaction mixture is stirred for a further one to two hours at 130° C., until a check of the conversion by way of the SiH value shows that the ethoxylated 2-butyne-1,4-diol has been added on completely by means of a hydrosilylation reaction. When the conversion exceeds 99%, the reaction is terminated and catalyst residues are removed from the reaction mixture by filtration. The solvent, as well as volatile by-products are removed by a subsequent distillation in a vacuum produced by an oil pump.

Analyses by means of $^1H$, $^{13}C$ and $^{29}Si$ NMR confirm the expected structure and show that the addition product of the starting materials can be described by the following formula (corresponding to the spectroscopic data):

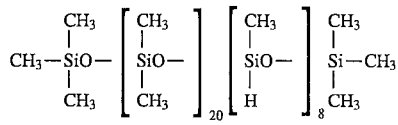

$$R^* = -\underset{\underset{CH-CH_2-(OC_2H_4-)_{1.1}OH}{\|}}{C}-CH_2-(OC_2H_4-)_{1.1}OH$$

The hydroxyalkyl-functional siloxane, so prepared (185 g, 0.05 moles), to which 0.2 g of sulfuric acid (98%) is added as acidic catalyst, is heated to 60° C. At this temperature, 17.2 g (0.2 moles) of acetic anhydride are added dropwise and the reaction temperature is increased to 70° C. The reaction system is stirred for two hours at this temperature and subsequently neutralized by the addition of 4.0 g of sodium carbonate. After that, volatile byproducts are removed by distillation at 120° C. in the vacuum of an oil pump. The product is subsequently filtered hot. According to analytical results, the partially acetylated reaction product corresponds to the expected composition and can be described as a siloxane having the following average formula:

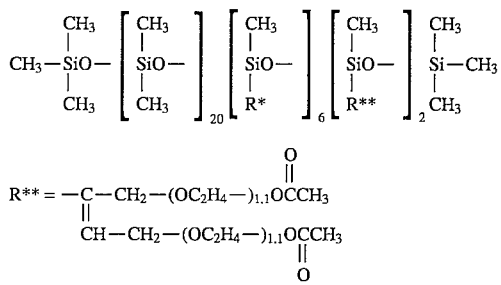

$$R^{**} = -\underset{\underset{CH-CH_2-(OC_2H_4-)_{1.1}OCCH_3}{\|}}{C}-CH_2-(OC_2H_4-)_{1.1}OCCH_3$$
$$\phantom{R^{**} = -C-CH_2-}\| \phantom{xxxxxxxxxxxxxxxxxx}\|$$
$$\phantom{R^{**} = -C-CH_2-}O \phantom{xxxxxxxxxxxxxxxxxx}O$$

The product has a viscosity of 3975 mPas at 20° C.

EXAMPLE 2

Preparation of the Defoamer T2

A mixture of 111.6 g (0.61 moles) of ethoxylated 2-butyne-1,4-diol and 135.1 g (0.25 moles) of a polyoxyalkylene polymer having the average formula $CH_2=CH-CH_2(O-C_2H_4-)_7-(O-C_3H_6-)_3OH$, 2.5 g of sodium carbonate and 6 mg of hexachloroplatinic acid $H_2PtCl_6$ is added to an 800 mL 4-neck flask, equipped with stirrer, dropping funnel, thermometer and reflux condenser and heated with stirring to 110° C. At this temperature, 212.7 g (0.1 mole) of a polydi-methylsiloxane, functionalized laterally with SiH groups and having the general formula

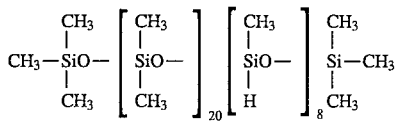

is added dropwise over a period of 45 minutes in such a manner that, despite the exothermic reaction, a temperature of 120° C. is not exceeded. At the end of the addition, stirring of the reaction mixture at 125° C. is continued, until an SiH conversion in excess of 99% is attained.

After distillation in a rotary evaporator in order to remove volatile byproducts and cooling, a 95% yield of a clear, yellow, low viscosity (2,800 mPas at 20° C.) reaction product is obtained which, according to spectroscopic data, corresponds to the expected structure

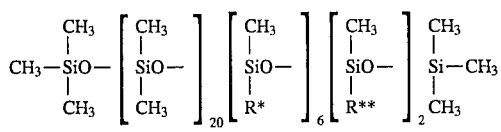

R*=as in Example 1
R**=—(CH$_2$—)$_3$(OC$_2$H$_4$—)$_7$(OC$_3$H$_6$—)$_3$OH

EXAMPLE 3

Preparation of Defoamer T3

To a 500 mL 4-neck flask, equipped with stirrer, dropping funnel, thermometer and reflux condenser, 172.0 g (0.94 moles) of an ethoxylated 2-butyne-1,4-diol, 4 mg (=20 ppm of Pt) of hexachloroplatinic acid H$_2$PtCl$_6$, 2 g of sodium carbonate and 30 mL of toluene are added and heated with stirring to 110° C. To this, a mixture of 209.8 g (0.1 moles) of a polydimethylsiloxane, functionalized with terminal and lateral SiH groups and having the average formula

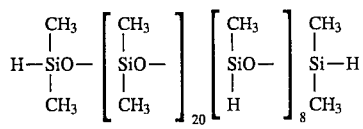

and 22.4 g (0.11 moles) of 1-hexadecene are added dropwise in such a manner, that a temperature of 125° C. is not exceeded. After the exothermic reaction has subsided, the temperature is increased to 130° C. and the mixture is held at this temperature until an SiH conversion of more than 99% is attained. The product is worked up by filtration and subsequent distillation in a rotary evaporator. NMR analysis of the yellow reaction product shows that a polydimethyl- siloxane of the following average composition is obtained:

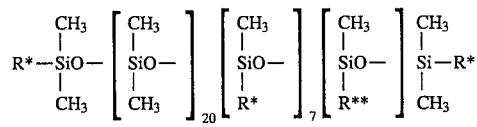

R*=as in Example 1
R**=—(CH$_2$—)$_{15}$CH$_3$

The product has a viscosity of 3,225 mPas at 20° C.

EXAMPLE 4

Preparation of Defoamer T4

A mixture of 112.5 g (1.12 moles) of 5-hexene-1-ol, 70.2 g (0.13 moles) of a polyoxyalkylene polymer having the average formula CH$_2$=CH—CH$_2$(O—C$_2$H$_4$—)$_7$(O—C$_3$H$_6$—)$_3$OH, 2 g of sodium carbonate and 4 mg of hexachloroplatinic acid H$_2$PtCl$_6$ is heated with stirring to a 110° C. At this temperature, 135.7 g (0.1 moles) of a polydimethylsiloxane, functionalized with lateral SiH groups and having the general formula

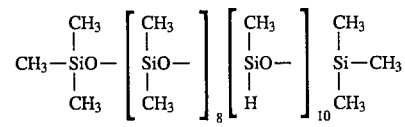

are added dropwise within 30 minutes at such a rate that, despite the exothermic reaction, the temperature does not exceed 120° C. After that, stirring at 125° C. is continued, until an SiH conversion of more than 99% is attained.

Subsequently, the end product is filtered and distilled in order to remove excess alcohol, as well as volatile byproducts. A yellow reaction product with a viscosity of 2,600 mPas at 20° C. is obtained in an amount of 300 g, corresponding to 98% of the theoretical yield. According to spectroscopic data, the product can be described by the following general formula:

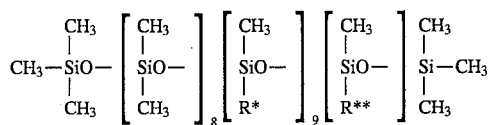

R*=—(CH$_2$—)$_6$OH
R**=as in Example 2

EXAMPLE 5

Preparation of Defoamer T5

The polydimethylsiloxane of Example 4 (134 g, 0.1 moles), functionalized laterally with SiH groups and having an average chain length of N=20, and 1.6 mg (=5 ppm of Pt) of hexachloroplatinic acid are added to a 500 mL 4-neck flask. After that, the mixture is heated to 110° C. with stirring. At this temperature, 44.8 g (0.2 moles) of 1-hexadecene are swiftly added dropwise and stirring is continued.

After the theoretically possible SiH conversion of 20% is reached, the partially hexadecyl-functional SiH siloxane copolymer, which has the average composition

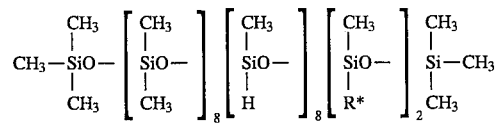

R*=—(CH$_2$—)$_{15}$CH$_3$
is cooled to room temperature.

In a second step of the reaction, 104.1 g of 5-hexene-1-ol (1.04 moles), 1.4 g of sodium carbonate and 2.6 mg of H$_2$PtCl$_6$ are added and heated with stirring to 120° C. At this temperature, 174 g (0.1 moles) of the partially hexadecyl- functional SiH siloxane from the first step of the reaction are added dropwise over a period of 30 minutes, after which stirring is continued until a conversion of more than 99% is reached. The end product is then filtered and subsequently distilled, in order to remove excess alcohol and volatile byproducts. A yellow reaction product (250 g, corresponding to 98% of the theoretical yield), which has a viscosity of 4,200 mPas at 20° C., is obtained. According to spectroscopic data, the product can be described by the following general formula:

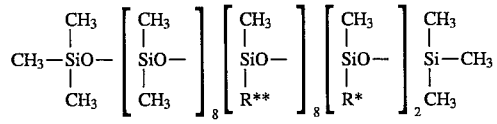

R**=—(CH$_2$—)$_6$OH

EXAMPLE 6

Preparation of Defoamer T6

As described in Example 5, a partially hexadecyl-functional SiH siloxane, having the average composition

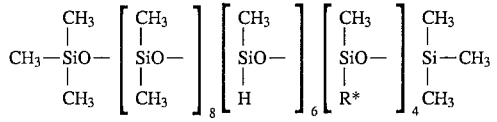

R*=as in Example 5 is prepared using the same SiH siloxane, but varying the amount of 1-hexadecene used for forming the derivative. Subsequently, the remaining SiH groups of the material are reacted in a similar manner in a second step of the reaction with 5-hexene-1-ol. After working up by filtration and distillation, a yellow reaction product with a viscosity of 1,325 mPas at 20° C. is obtained and corresponds, according to spectroscopic data to the following general formula

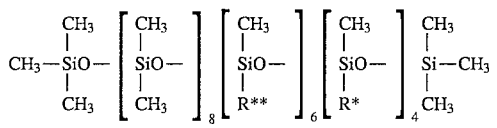

R**=as in Example 5

EXAMPLE 7

Preparation of Defoamer T7

As described in Example 5, 124.9 g (0.044 moles) of a polydimethyl siloxane, functionalized with lateral SiH groups and having the general formula

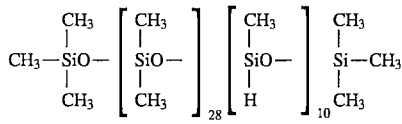

is reacted with 19.7 g (0.088 moles) of 1-hexadecene using 4.5 mg of hexachloroplatinic acid as catalyst in a hydrosilylation reaction to form an SiH-containing siloxane copolymer having the average formula

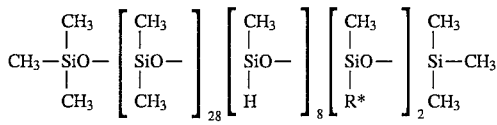

R*=as in Example 5

In a second step of the reaction, 52.5 g (0.016 moles) of the partially hexadecyl-functional SiH siloxane are added dropwise at a temperature of 110° C. with stirring to a mixture of 25 g of toluene, 64.4 g (0.16 moles) of a polyoxyalkylene polymer of average composition $CH_2=CH-CH_2(O-C_2H_4-)_9OH$ and 1 g of sodium carbonate in such a manner, that the temperature does not exceed 120° C. After the addition, stirring is continued at this temperature until a check of the conversion by means of the SiH value shows that a conversion of more than 99% has been attained.

After filtration and removal of solvent and volatile by-products by distillation, 112 g (corresponding to 95% of the theoretical yield) of a clear, yellow reaction product with a viscosity of 950 mPas at 20° C. are obtained. On the basis of the spectroscopic data, the reaction product can be described by the following formula:

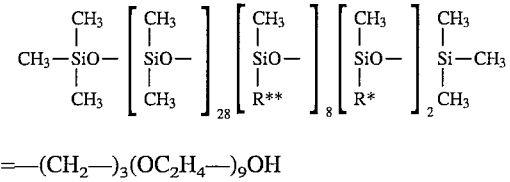

$R**=-(CH_2-)_3(OC_2H_4-)_9OH$

EXAMPLE 8

Preparation of Defoamer T8

The partially hexadecyl-functional SiH siloxane of Example 7 (55 g, 0.017 moles) is reacted in the manner described with 100 g (0.167 moles) of an allyl polyether in a hydrosilylation reaction. After the complete saturation of the remaining SiH groups by polyether functions and working up by filtration and distillation, a yellow reaction product with a viscosity of 2100 mPas at 20° C. is obtained. According to spectroscopic data, the following general formula

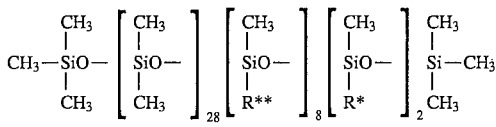

R*=as in Example 5
$R**=-(CH_2-)_3(OC_2H_4-)_{13}OH$
can be assigned to the reaction product.

EXAMPLE 9

Preparation of Defoamer T9

As described in Example 7, a partially hexadecyl-functional SiH siloxane, having the average composition

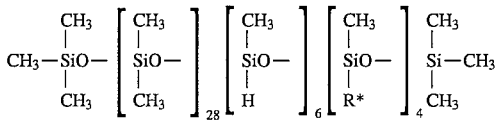

R*=as in Example 5 is prepared using the same SiH siloxane but varying the amount of 1-hexadecene used to form the derivative. Subsequently, the remaining SiH groups of the material are reacted in a similar manner in a second reaction step with an allyl polyether (MW of 600, ethoxylated homopolymer). After working up by filtration and distillation, a yellow reaction product with a viscosity of 4125 mPas at 20° C. is obtained. According to spectroscopic data, the reaction product corresponds to the following general formula

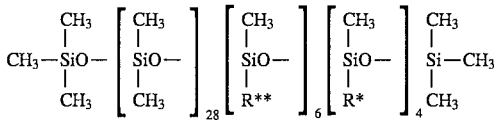

R**=as in Example 8

If additional polyethers are used, these have the following composition and labeling

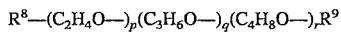

| Labeling | p | q | r | $R^8$ | $R^9$ |
| --- | --- | --- | --- | --- | --- |
| P1 | 7 | 0 | 0 | —OH | butyl |
| P2 | 9 | 0 | 0 | —OCH$_3$ | allyl |
| P3 | 14 | 0 | 0 | —OH | —H |
| P4 | 13 | 4 | 0 | —OH | allyl |
| P5 | 7 | 3 | 0 | —OH | butyl |
| P6 | 13 | 0 | 14 | —OH | butyl |

In the event that emulsifiers are also used, the following types of compounds are employed:

Type A: $CH_3—(CH_2—)_n(OC_2H_4—)_mOH$

Type B: $C_9H_{19}—C_6H_4O—(C_2H_4O—)_nH$

Type C: $X—(CH_2—CH(COOCH_3)—)_n—(CH_2—CH(COOR^a)—)_m—(CH_2—CH(COOR^b)—)_oY$

In the above, X and Y represent the usual end groups of polyacrylates, which depend on the synthesis conditions. $R^a$ represents a polyether group and $R^b$ an oleyl group.

The labeling and the values for the subscripts are given in the following Table:

| Labeling | Type | n | m | o |
| --- | --- | --- | --- | --- |
| E1 | A | 17 | 20 | — |
| E2 | B | 15 | — | — |
| E3 | C | 16 | 3 | 13 |
| E4 | C | 16 | 9 | 8 |

If the organofunctionally modified organopolysiloxanes are mixed with polyethers and optionally emulsifiers, the following defoamer formulations are used:

| Defoamer Formulation | Siloxane of the Invention | Polyether | Emulsifier |
| --- | --- | --- | --- |
| F1 | 25% T1 | 75% P5 | — |
| F2 | 20% T1 | 78% P5 | 2% E1 |
| F3 | 20% T1 | 78% P5 | 2% E2 |
| F4 | 20% T1 | 78% P5 | 2% E3 |
| F5 | 20% T1 | 78% P5 | 2% E4 |
| F6 | 20% T1 | 78% P1 | 2% E4 |
| F7 | 30% T2 | 68% P2 | 2% E4 |
| F8 | 30% T1 | 68% P3 | 2% E4 |
| F9 | 20% T1 | 75% P4 | 5% E4 |
| F10 | 20% T7 | 78% P6 | 2% E4 |
| F11 | 30% T1 | 60% P5 | 10% E4 |

Comparison experiments were carried out with products of the state of the art, the compounds T1 to T9 and the formulations F1 to F11. As comparison substances, defoamer A (corresponding to British patent 2,173,510) and defoamer B (corresponding to the German Offenlegungsschrift 40 32 006) were used:

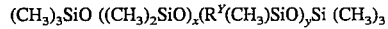

Defoamer A:

$R^Y=—(CH_2—)_3(OC_2H_4—)_{14}OH$

X=13

Y=3

Defoamer B:

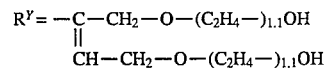

x=20 y=6

To test the defoaming capability of the siloxanes, which are to be used pursuant to the invention, or of the preparations containing these, the siloxanes or the preparations are dissolved in an additive package of the state of the art and a certain amount of this mixture is stirred into 1500 g of additive-free diesel fuel. The mixing ratio of the siloxane or its preparation to the additive package and the amount of this additive added to the fuel are selected so that the desired siloxane concentration and, at the same time, an additive package concentration of 200 ppm is achieved in the diesel fuel. The concentration of the inventive compounds in the diesel fuel is varied between 2 and 20 ppm. For each product or each formulation, the approximate critical concentration is determined, below which a clear decline in activity sets in for the first time. The collapse of foam of the diesel fuel, which is mixed with additive and defoamer, is tested in a pressure apparatus. This apparatus consists essentially of a 1-liter pressure vessel, which can be acted upon with a constant pressure of compressed air, and a 1-liter measuring cylinder.

An outlet nozzle of the pressure vessel, which is provided with a magnetic valve, is centered over the measuring cylinder and dips only a few centimeters into the latter. For each test, 350 g of the diesel fuel to be tested are filled into the pressure vessel, acted upon with compressed air under a pressure of 2 bar and discharged with the help of the magnetic valve during a period of 3 seconds into the measuring cylinder. The volume difference resulting from the maximum foam level and the level of the foam-free liquid in the measuring cylinder is given in mL and referred to as the foam volume. The time that elapses from the moment that the foam reaches a maximum level to the moment that the foam layer over the liquid collapses to a collar is measured in seconds and referred to as the foam collapse time. Three measurements are carried for each defoamer formulation and the averages for the foam height and the collapse time are determined.

Three different additive packages, corresponding to the state of the art, are used to investigate the compatibility with defoamer formulations. In each case, 1 g of the siloxane, which is to be used pursuant to the invention, or of the preparation, which contains the siloxane, is added to 19 g of an additive package and stirred. The defoamer is described as compatible with the additive package if cloudiness or the formation of a second phase cannot be detected in the additive package within one week at room temperature.

The result of the compatibility test is rated positive and marked with a "+", if the formulation investigated is compatible with all three additive packages tested; otherwise, it is rated negative and marked with a "−".

The results of the foam collapse test and the compatibility test are combined in the following Table. As described above, the concentrations given are the critical use concentrations for each defoamer formulation; lower concentrations lead to a distinct worsening of the defoaming behavior. The silicon content of the diesel fuel, mixed with the defoamer, is determined from the use concentration of the defoamer, the proportion of organically modified polysiloxane in the formulation and the theoretical silicon content of the formulation, which is determined by means of the average structural formula.

| Defoamer | Use Conc. (ppm) | Foam volume (mL) | Collapse time (s) | Compatibility | Si Content in the Diesel Fuel (ppm of Si) |
|---|---|---|---|---|---|
| Blank |  | 155 | 35 |  |  |
| A | 15 | 72 | 2 | – | 2.25 |
| B | 15 | 70 | 2 | – | 3.75 |
| T1 | 5 | 73 | 1 | + | 1.10 |
| T2 | 5 | 72 | 1 | + | 1.00 |
| T3 | 5 | 80 | 2 | + | 1.05 |
| T4 | 5 | 73 | 1 | + | 1.00 |
| T5 | 15 | 143 | 8 | + | 3.15 |
| T6 | 15 | 155 | 10 | + | 3.00 |
| T7 | 15 | 57 | 1 | + | 2.55 |
| T8 | 15 | 69 | 1 | + | 2.10 |
| T9 | 15 | 71 | 2 | + | 2.25 |
| F1 | 15 | 90 | 2 | + | 0.83 |
| F2 | 15 | 86 | 2 | + | 0.66 |
| F3 | 15 | 85 | 2 | + | 0.66 |
| F4 | 15 | 73 | 1 | + | 0.66 |
| F5 | 10 | 70 | 1 | + | 0.44 |
| F6 | 15 | 84 | 1 | + | 0.66 |
| F7 | 10 | 74 | 1 | + | 0.60 |
| F8 | 15 | 85 | 1 | + | 0.99 |
| F9 | 15 | 88 | 1 | + | 0.66 |
| F10 | 15 | 104 | 5 | + | 0.51 |
| F11 | 15 | 73 | 1 | + | 0.99 |

The Table shows that the organofunctionally modified polysiloxanes T1 to T9, which are to be used pursuant to the invention, and the formulations F1 to F11 containing these are very suitable for defoaming diesel fuel. In contrast to the comparison products, silicon contents of clearly less than 1 ppm and, in some cases, even less than 0.5 ppm can be achieved in the diesel fuel. The formation of silica during the combustion in the engine can thus be reduced to one-fifth of the value that corresponds to the state of the art. A further advantage of the inventive defoamer is the good compatibility with the fuel additive package. The use of solubilizers can thus be avoided and the danger that the defoamer will precipitate from the additive package during storage, for example, under unfavorable weather conditions, can be reduced.

What is claimed is:

1. A method of defoaming diesel fuel by adding to the fuel an organofunctionally modified polysiloxane of the general Formula I

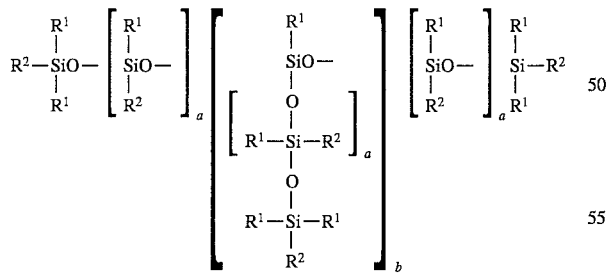

wherein
R$^1$ are methyl groups,
R$^2$ are the same or different in a molecule,
30 to 90% of R$^2$ having the same meaning as R$^1$, and
70 to 10% of R$^2$ consisting of a mixture of R$^{2A}$ and R$^{2B}$ groups, wherein the R$^{2A}$ group is more polar than the R$^{2B}$ groups and the R$^{2A}$ group is selected from the following group consisting of:

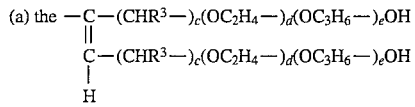

group, wherein
R$^3$ is a hydrogen or alkyl group,
c is a number from 1 to 20,
d is a number from 0 to 50,
e is a number from 0 to 50,
(b) the —(CH$_2$—)$_f$OR$^4$ group, wherein
R$^4$ is a hydrogen or a univalent organic group,
f is a number from 3 to 20, and
(c) the —(CH$_2$—)$_g$(OC$_2$H$_4$—)$_h$(OC$_3$H$_6$—)$_i$OR$^5$ group, wherein
R$^5$ is a hydrogen or a univalent organic group,
g is a number from 3 to 6,
h is a number from 1 to 50,
i is a number from 0 to 20; and
the ratio of h:i>5:2; and
the R$^{2B}$ group is selected from the following group consisting of:

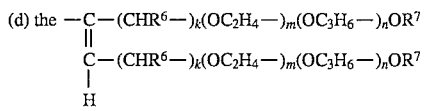

group, wherein
R$^6$ is a hydrogen or alkyl group,
R$^7$ is an alkylsilyl, acylsilyl or trialkylsilyl group
k is a number from 1 to 20,
m is a number from 0 to 50,
n is a number from 0 to 50; and
(f) the —(CH$_2$—)$_g$(OC$_2$H$_4$—)$_h$(OC$_3$H$_6$—)$_i$OR$^5$ group, wherein
R$^5$ is hydrogen or a univalent organic group,
g is a number from 3 to 6,
h is a number from 0 to 35,
i is a number from 1 to 50 and the ratio of h:i <5:2,
a is a number from 1 to 400,
b is a number from 0 to 10,
in an amount of 0.5 to 50 ppm based on the diesel fuel.

2. Diesel fuel containing 0.5 to 50 ppm of an organofunctionally modified polysiloxane of a general Formula I

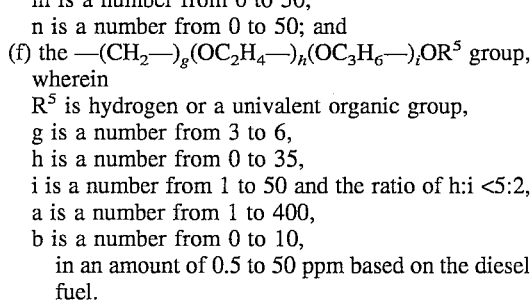

wherein
R$^1$ are methyl groups,
R$^2$ are the same or different in a molecule,
30 to 90% of R$^2$ having the same meaning as R$^1$, and
70 to 10% of R$^2$ consisting of a mixture of R$^{2A}$ and R$^{2B}$ groups, wherein the R$^{2A}$ group is more polar than the R$^{2B}$ groups and the R$^{2A}$ group is selected from the following group consisting of:

(a) the 
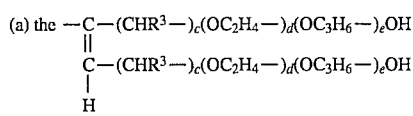
group, wherein
$R^3$ is a hydrogen or alkyl group,
c is a number from 1 to 20,
d is a number from 0 to 50,
e is a number from 0 to 50,
(b) the $-(CH_2-)_f-OR^4$ group, wherein
$R^4$ is a hydrogen or a univalent organic group,
f is a number from 3 to 20, and
(c) the $-(CH_2-)_g(OC_2H_4-)_h(OC_3H_6-)_iOR_5$ group, wherein
$R^5$ is a hydrogen or a univalent organic group,
g is a number from 3 to 6,
h is a number from 1 to 50,
i is a number from 0 to 20; and
the ratio of h:i >5:2; and the $R^{2B}$ group is selected from the following group consisting of:

(d) the 
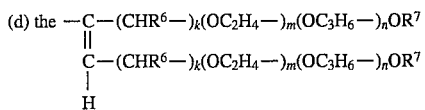
group, wherein
$R^6$ is a hydrogen or alkyl group,
$R^7$ is an alkylsilyl, acylsilyl or trialkylsilyl group
k is a number from 1 to 20,
m is a number from 0 to 50,
n is a number from 0 to 50; and
(e) the $-(CH_2-)_g(OC_2H_4-)_h(OC_3H_6-)_iOR_5$ group, wherein
$R^5$ is hydrogen or a univalent organic group,
g is a number from 3 to 6,
h is a number from 0 to 35,
i is a number from 1 to 50 and the ratio of h:i <5:2,
a is a number from 1 to 400,
b is a number from 0 to 10.

* * * * *